US007946533B2

(12) United States Patent
Goodzeit

(10) Patent No.: US 7,946,533 B2
(45) Date of Patent: *May 24, 2011

(54) OPTIMIZED LAND MOBILE SATELLITE SYSTEM FOR NORTH AMERICAN COVERAGE

(75) Inventor: Neil E. Goodzeit, Princeton, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 12/606,145

(22) Filed: Oct. 26, 2009

(65) Prior Publication Data

US 2010/0108818 A1 May 6, 2010

Related U.S. Application Data

(62) Division of application No. 11/030,282, filed on Jan. 7, 2005, now Pat. No. 7,669,803.

(60) Provisional application No. 60/633,962, filed on Dec. 7, 2004.

(51) Int. Cl.
*B64G 1/10* (2006.01)

(52) U.S. Cl. .................. 244/158.4; 244/158.6; 701/226

(58) Field of Classification Search .............. 244/158.4, 244/158.6, 171, 164, 158.1; 455/427, 428, 455/12.1, 13.2, 13.3; 701/226; 342/356
See application file for complete search history.

(56) References Cited

U.S. PATENT DOCUMENTS

| 6,017,003 | A | 1/2000 | Mullins |
| 6,223,019 | B1 | 4/2001 | Briskman et al. |
| 6,283,415 | B1 | 9/2001 | Rosen |
| 6,318,676 | B1 | 11/2001 | Turner et al. |
| 6,325,332 | B1 | 12/2001 | Cellier et al. |
| 6,564,053 | B1 | 5/2003 | Briskman et al. |
| 6,616,104 | B1 | 9/2003 | Cheng et al. |
| 6,695,259 | B1 | 2/2004 | Maeda |
| 6,851,651 | B2 | 2/2005 | Goodzeit |

(Continued)

FOREIGN PATENT DOCUMENTS

EP 1 116 657 A2 7/2001

(Continued)

OTHER PUBLICATIONS

Yoshio Karasawa, et al., "Analysis Of Availability Improvement in LMSS By Means Of Satellite Diversity Based On Three-State Propagation Channel Model", IEEE Transactions On Vehicular Technology, vol. 46, No. 4, Nov. 1997.

(Continued)

*Primary Examiner* — Benjamin P Lee
(74) *Attorney, Agent, or Firm* — McDermott Will & Emery LLP

(57) ABSTRACT

A constellation, including a plurality of spacecraft, including a first, second and third spacecraft, each of the plurality of spacecraft including a broadcast capability, and each of the plurality of spacecraft in its own approximately 24-hour orbit. Each of the orbits has a substantially teardrop-shaped or oval-shaped ground track, is optimized based upon elevation angle or probability of signal availability, and has an apogee longitude of approximately 90° west to approximately 100° west. Each of the orbits has a semi-major axis of approximately 42,164 kilometers, an argument of perigee of approximately 270°, an inclination of approximately 40° to approximately 60°, and an eccentricity of approximately 0.16 to approximately 0.4. The orbits of each of the plurality of spacecraft are selected to bring each of the spacecraft to apogee at time increments of approximately eight hours.

25 Claims, 25 Drawing Sheets

U.S. PATENT DOCUMENTS

| | | |
|---|---|---|
| 7,277,673 B2 | 10/2007 | Castiel |
| 7,357,356 B1 | 4/2008 | Goodzeit et al. |
| 7,369,809 B1 | 5/2008 | Wang |
| 2002/0136191 A1 | 9/2002 | Draim et al. |
| 2003/0034422 A1 | 2/2003 | Higgins |
| 2003/0155468 A1 | 8/2003 | Goodzeit |
| 2003/0189136 A1 | 10/2003 | Maeda et al. |
| 2003/0228867 A1 | 12/2003 | Castiel |
| 2005/0098686 A1 | 5/2005 | Goodzeit |
| 2007/0032191 A1 | 2/2007 | Marko |

FOREIGN PATENT DOCUMENTS

| | | |
|---|---|---|
| WO | WO 03/061141 A2 | 7/2003 |

OTHER PUBLICATIONS

"S-Dars Broadcast From Inclined, Elliptical Orbits", by Robert D. Briskman, et al., 52nd International Astronautical Congress, Oct. 1-5, 2001, Toulouse, France.

OPTIMIZED LAND MOBILE SATELLITE SYSTEM FOR NORTH AMERICAN COVERAGE

CROSS-REFERENCE TO RELATED APPLICATIONS

This application is a divisional application of U.S. patent application Ser. No. 11/030,282, entitled "Optimized Land Mobile Satellite System for North American Coverage," filed Jan. 7, 2005, now U.S. Pat. No. 7,669,803 which claims the benefit of priority under 35 U.S.C. §119 from U.S. Provisional Patent Application No. 60/633,962, entitled "Enhanced Orbit Designs Utilizing Improved Attitude Steering Options," filed Dec. 7, 2004. Furthermore, this application is related to U.S. patent application Ser. No. 10/176,936, filed Jun. 21, 2002. All of the aforementioned documents are incorporated herein by reference in their entirety for all purposes.

STATEMENT AS TO RIGHTS TO INVENTIONS MADE UNDER FEDERALLY SPONSORED RESEARCH OR DEVELOPMENT

Not Applicable

FIELD OF THE INVENTION

The present invention relates generally to spacecraft constellations used for broadcast communication purposes and, more particularly, relates to spacecraft constellations which are optimized to provide North American mobile satellite services ("MSSs").

BACKGROUND OF THE INVENTION

Conventional land mobile satellite systems ("LMSSs"), such as the SIRIUS SATELLITE RADIO® mobile satellite system, use a constellation of three satellites in 24-hour repeating ground track, highly elliptical orbits ("HEO") to provide high elevation angle coverage of the continental United States and Canada. The ground track of the orbit disclosed in U.S. Pat. No. 6,564,053 ("the Briskman patent") is depicted as orbit 101 in FIG. 1. Orbit 101 has an orbit inclination of 63.4°, and a coverage of ±8 hours about the orbit apogee.

The conventional orbit described in the Briskman patent includes a pronounced figure-eight loop over northern Canada, which reduces the elevation angles to the coverage region (depicted as a cluster of asterisks). While the system and orbit described in the Briskman patent provides user-to-spacecraft elevation angles which are significantly higher than typical geostationary earth orbit ("GEO") systems, the orbit described therein is suboptimal, based on a range of criteria related to system performance. Specifically, and as illustrated in FIG. 2, when the corresponding elevation angles for 125 North American cities are plotted, an elevation droop (denoted by reference 201) is evident when a spacecraft is near apogee, since high latitudes reduce elevation angles to the coverage region, resulting in a lower probability of link closures. The probability of link closure in an urban environment with at least one spacecraft and at least two spacecraft are depicted in the chart at FIGS. 3 and 4, respectively.

Due to their substantial build, launch and operational costs, it is considered highly desirable to overcome the deficiencies of conventional land mobile satellite systems. Specifically, it is desirable to provide an enhanced land mobile satellite system using an optimized orbit which reduces the system cost to achieve a given quality of service, by allowing the use of lower power and lighter satellites, and using fewer terrestrial repeaters or, conversely, allowing improved performance using the highest spacecraft power capability available.

SUMMARY OF THE INVENTION

The present invention relates generally to spacecraft constellations used for broadcast communication purposes and, more particularly, relates to spacecraft constellations which are optimized to provide North American MSS.

According to one arrangement, the present invention is a constellation, including a plurality of spacecraft, each of the plurality of spacecraft in its own approximately 24-hour orbit. Each of the orbits has a substantially teardrop-shaped or oval-shaped ground track, is optimized based upon performance criteria, and has an apogee longitude of approximately 90° west to approximately 100° west.

The present invention uses non-linear optimization to determine the improved orbit, where the improved orbits provide significantly higher elevation angles, and improved probability of signal availability. Higher elevation angles provide improved service quality by reducing signal blockages, resulting in higher signal strength to users in the coverage region. In contrast to conventional systems, the optimized orbit of the constellation of the present invention largely eliminates the figure-eight ground track, and instead exhibits a preferable teardrop or oval shape. The teardrop or oval shaped orbit results in the operational spacecraft remaining in the coverage region for a longer period of time.

Each of the orbits has a semi-major axis of approximately 42,164 kilometers, an argument of perigee of approximately 270°, an inclination of approximately 40° to approximately 60°, and an eccentricity of approximately 0.16 to approximately 0.4.

The plurality of spacecraft further includes a first, second and third spacecraft, and the orbits of each of the plurality of spacecraft are selected to bring each of the spacecraft to apogee at time increments of approximately eight hours. Each of the plurality of spacecraft includes a broadcast capability. The performance criteria include elevation angle from a coverage region to the plurality of spacecraft, and/or signal availability from at least one spacecraft, from at least two spacecraft, or from all operating spacecraft.

According to a second arrangement, the present invention is a method of providing North American mobile satellite services, including the step of placing a plurality of broadcast spacecraft in similar approximately 24-hour orbits which may be rotated relative to each other, each of the plurality of spacecraft including a broadcast capability, each of the orbits having a substantially teardrop-shaped or oval-shaped ground track, being optimized based upon performance criteria, and having an apogee longitude of approximately 90° west to approximately 100° west. The method also includes the step of broadcasting from each of the plurality of spacecraft.

Each of the plurality of spacecrafts broadcasts in the northern hemisphere.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

Referring now to the drawings.

DETAILED DESCRIPTION OF THE INVENTION

Figure 1:
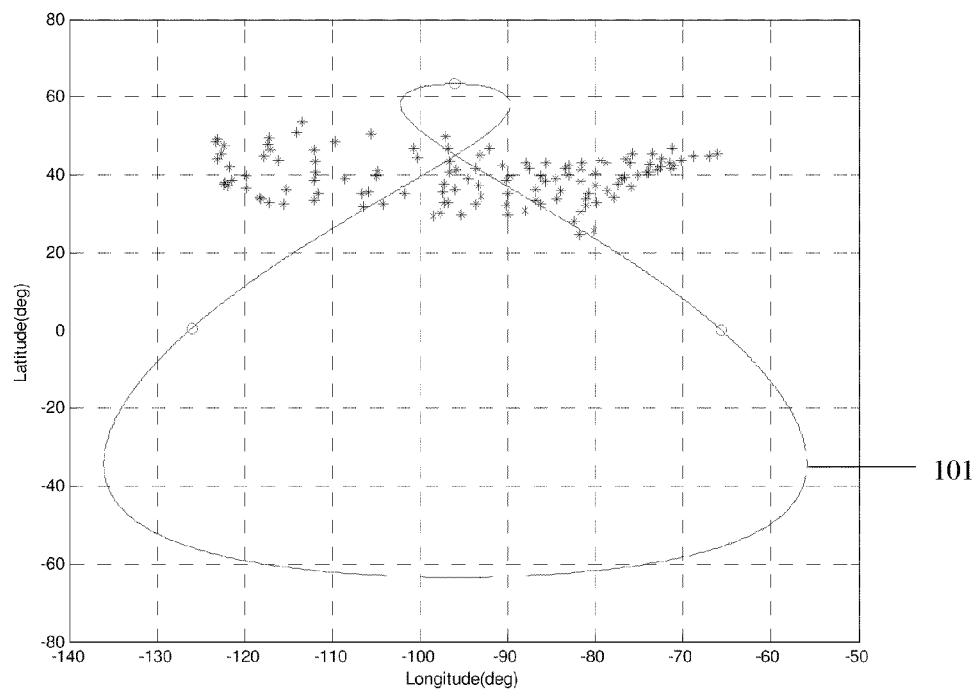
FIG. 1 depicts the ground track for the conventional, suboptimal orbit described in the Briskman patent.

The present invention provides a land mobile satellite system for North American coverage, which overcomes the deficiencies of conventional MSS systems. Specifically, the present invention provides an enhanced land mobile satellite system using an optimized orbit which reduces the system cost to achieve a given quality of service, by allowing the use of lower power and lighter satellites, and using fewer terrestrial repeaters.

The LMSS according to the present invention uses an improved orbit design that provides better user elevation angles and link availability performance. Depending upon the performance criteria to be optimized, a range of orbits is contemplated by the present invention, with specific example orbits described more fully below.

According to one arrangement, the present invention is a constellation, including a plurality of spacecraft, each of the plurality of spacecraft in its own approximately 24-hour orbit. Each of the orbits has a substantially teardrop-shaped or oval-shaped ground track, is optimized based upon performance criteria, and has an apogee longitude of approximately 90° west to approximately 100° west.

Each of the orbits has a semi-major axis of approximately 42,164 kilometers, an argument of perigee of approximately 270°, an inclination of approximately 40° to approximately 60°, and/or an eccentricity of approximately 0.16 to approximately 0.4.

The plurality of spacecraft includes a first, second and third spacecraft, and the orbits of each of the plurality of spacecraft are selected to bring each of the spacecraft to apogee at time increments of approximately eight hours. Each of the plurality of spacecraft includes a broadcast capability. The performance criteria include elevation angle from a coverage region to the plurality of spacecraft, and/or signal availability from at least one spacecraft, from at least two spacecraft, or from all operating spacecraft.

The present invention uses non-linear optimization to determine the improved orbit, where the improved orbits provide significantly higher elevation angles, and improved probability of signal availability. Higher elevation angles provide improved service quality by reducing signal blockages, resulting in higher signal strength to users in the coverage region. In contrast to conventional systems, the optimized orbit of the constellation of the present invention largely eliminates the figure-eight ground track, and instead exhibits a preferable teardrop or oval shape. The teardrop or oval shaped orbit results in the operational spacecraft remaining in the coverage region for a longer period of time.

Table 1, below, provides three example orbits which are contemplated by the present invention, and also provides a comparison to the conventional suboptimal orbit described in the Briskman patent.

TABLE 1

Representative Orbits According to the Invention

| Parameter | Conventional | Option 1 | Option 2 | Option 3 |
| --- | --- | --- | --- | --- |
| Inclination | 63.4 | 48.2 | 45.4 | 58.9 |
| Eccentricity | 0.27 | 0.24 | 0.40 | 0.35 |
| Apogee longitude (° W) | 96 | 95 | 95 | 95 |
| Performance Criteria Optimized | Not Optimized | Minimum composite elevation angle | Signal availability from at least one spacecraft | Signal availability from all operating spacecraft |
| Average elevation angle | 69.3 | 75.6 | 76.6 | 72.2 |
| Minimum elevation angle | 60.4 | 70.4 | 67.5 | 65.1 |
| Minimum availability of one spacecraft (suburban) | 0.990 | 0.996 | 0.997 | 0.993 |
| Minimum availability of one spacecraft (urban) | 0.958 | 0.984 | 0.986 | 0.972 |
| Minimum availability of two spacecraft (suburban) | 0.746 | 0.765 | 0.770 | 0.775 |
| Minimum availability of two spacecraft (urban) | 0.489 | 0.516 | 0.523 | 0.545 |

According to one aspect (entitled "Option 1" in Table 1), the orbit is optimized based upon minimum composite elevation angle for each city in the coverage region to an available spacecraft, over a day of system operation. The optimization considers three spacecraft separated by 8 hours in repeating ground tracks that operate for ±8 hours about the orbit apogee, where each spacecraft is assumed operational in the northern hemisphere only. According to these parameters, the composite elevation for the $i_{th}$ city is expressed in Equation (1), below:

$$\theta_i(t) = \max(\theta_{SC1i}(t), \theta_{SC2i}(t), \theta_{SC3i}(t))$$

$$0 \leq t \leq T_{orbit} \qquad (1)$$

In Equation (1), $\theta_{SC1i}(t)$, $\theta_{SC2i}(t)$, and $\theta_{SC3i}(t)$ represent the elevation angles to each spacecraft from the ith city or location in the coverage region, and $T_{orbit}$ represents the orbit period, or one sidereal day, which is approximately 24 hours.

Orbit parameters are determined which minimize the cost function, expressed in Equation (2), below:

$$J = \left[ \sum_{i=1}^{N} w_i (90° - \min[\theta_i(t, e, i, L, \omega)])^2 \right]^{1/2} \qquad (2)$$

In Equation (2), $90°-\min[\theta_i(t, e, i, L, \omega)]$ represents the maximum co-elevation angle for the $i_{th}$ city over a single sidereal day, e represents the orbit eccentricity, i represents the orbit inclination, L represents the longitude of the ascending node, ω represents the argument of perigee, N represents the number of cities (125), and $w_i$ represents normalized city weighting factors, expressed below in Equation (3), for preliminary analysis:

$$1 - \sum_{i=1}^{N} w_i \qquad (3)$$

$$w_i = \frac{1}{N} = \frac{1}{125}$$

The cost function (Equation (2)) is based on a composite elevation angle computed for 125 cities in the coverage region, which includes the continental United States and Canada. Alaska and Hawaii are not considered in this optimization, and equal weighting is applied to each of the 125 North American cities.

As indicated in Table 1, optimization based upon minimum composite elevation angle results in an orbit which provides elevation angles approximately 10 degrees higher than the conventional orbit. Furthermore, the optimized orbit provides a higher minimum probability of link availability in both suburban and urban environments. The optimized orbit has reduced inclination and eccentricity, compared to the conventional orbit.

Figure 5:
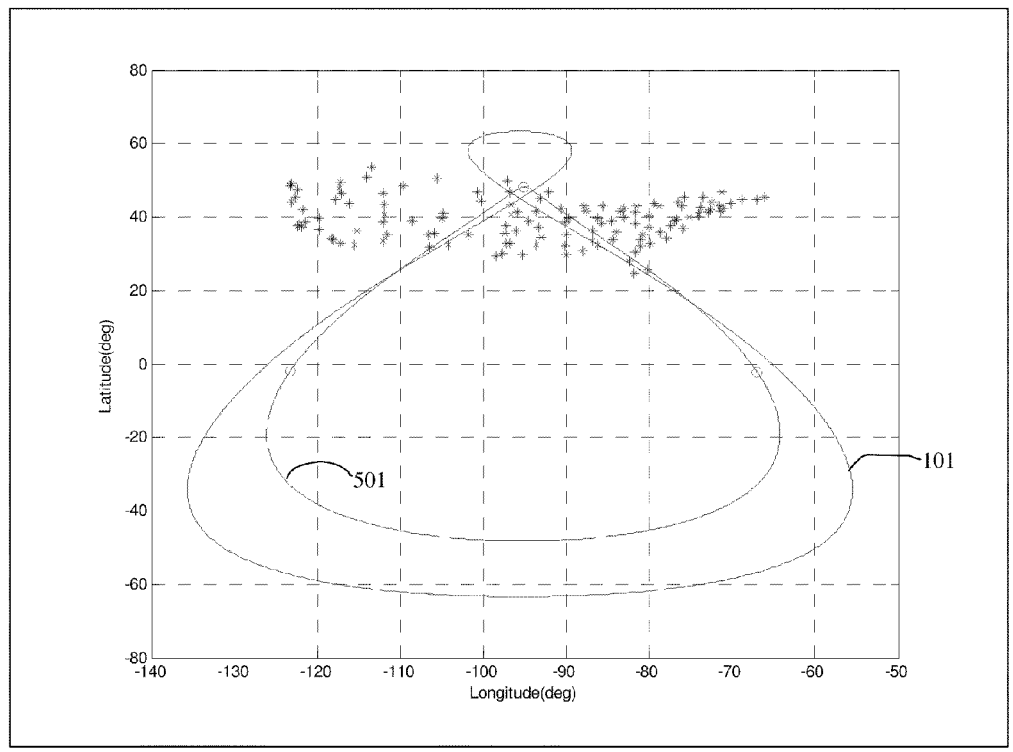
FIG. 5 depicts the ground track of an improved orbit according to present invention, where the orbit is optimized based upon minimum composite elevation angle for each city in a coverage region to an available spacecraft, over a day of system operation, superimposed on the conventional, FIG. 1 ground track.

FIG. 5 depicts the ground track of the above-described improved orbit, which is optimized based upon minimum composite elevation angle for each city in the coverage region to an available spacecraft, over a day of system operation. A distinguishing feature of the improved orbit, denoted by reference 501, is that it exhibits a distinctive teardrop shape, compared to the figure-eight ground track of the conventional system's orbit. The three small circles in FIG. 5 indicate the position of spacecraft at the start and end of the 16 hour service region and at apogee, which occurs at a longitude of roughly 95° west.

Figure 2:
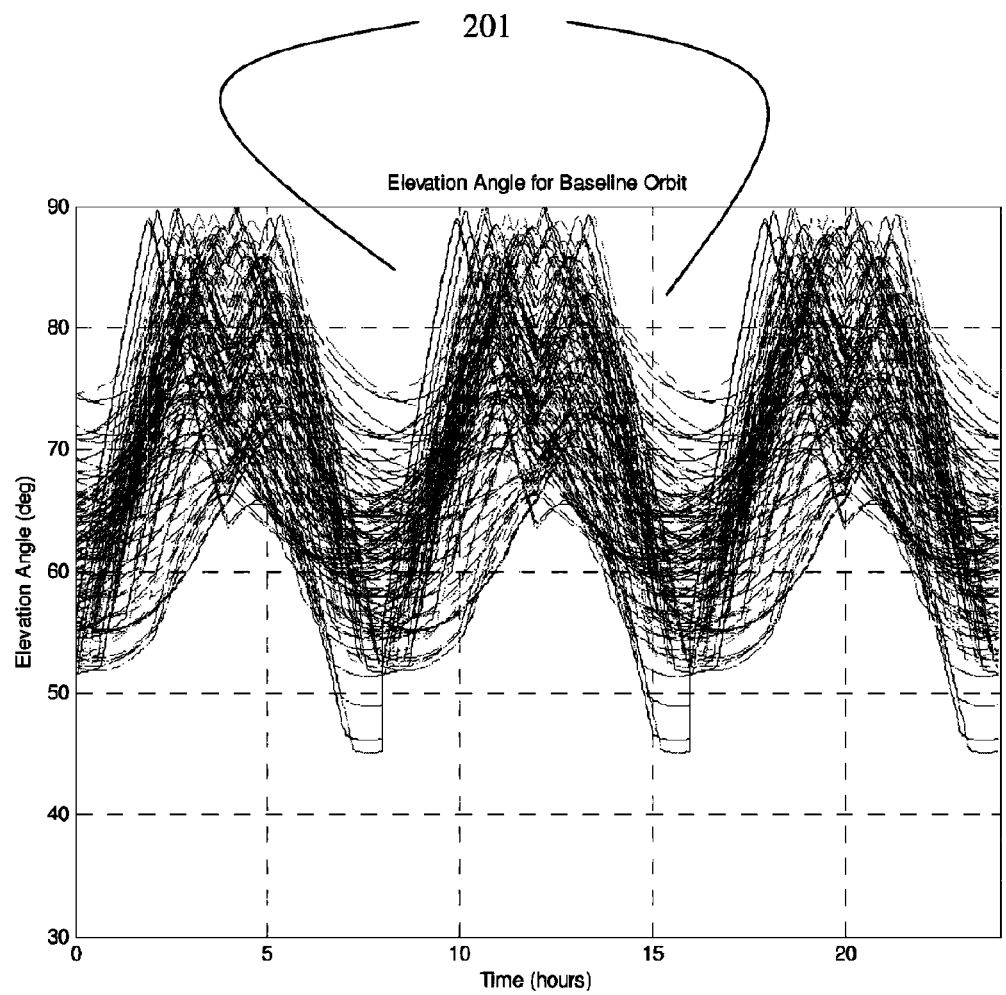
FIG. 2 depicts the corresponding elevation angles of the FIG. 1 orbit, for 125 North American cities.
Figure 6:
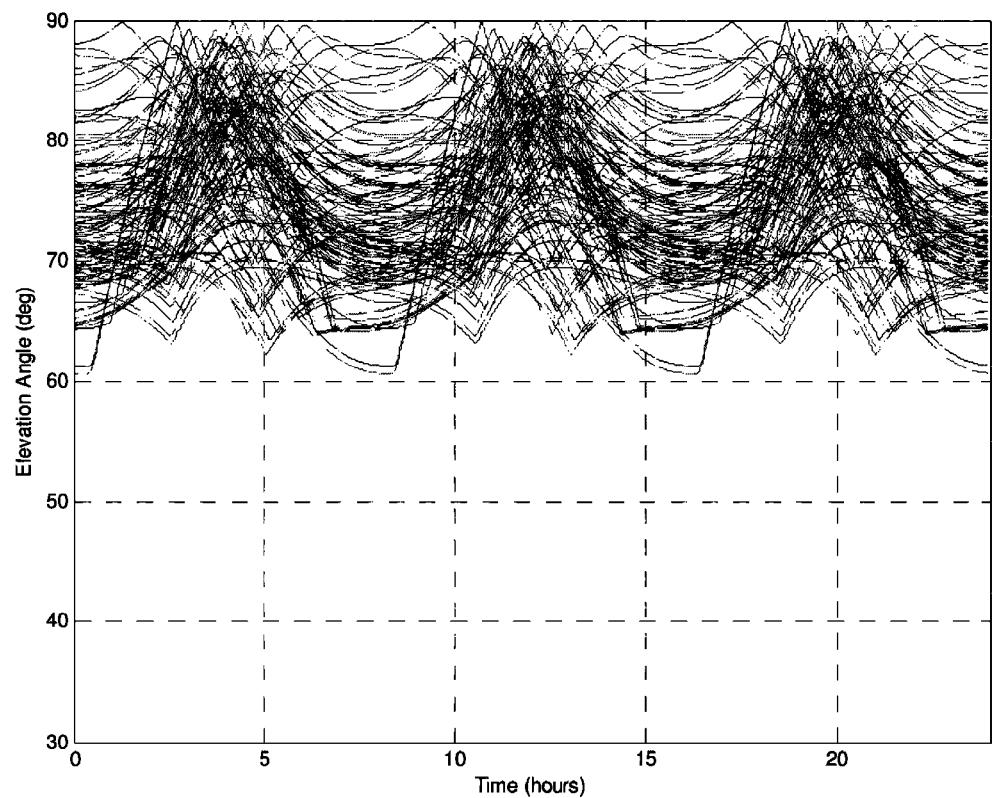
FIG. 6 depicts the corresponding elevation angles of the FIG. 5 improved orbit.

In contrast to the conventional orbit 101, the optimized orbit substantially eliminates the pronounced figure-eight loop over northern Canada. In particular, the optimized orbit exhibits a teardrop shape, resulting in the operational spacecraft remaining longer over the coverage region. To illustrate the improvement, FIG. 6 depicts the corresponding composite angles for the improved orbit to 125 North American cities. Comparing FIG. 6 to FIG. 2, it is clear that optimization of orbits eliminates the "elevation droop" associated with conventional orbits.

According to a second and a third aspect of the present invention (respectively entitled "Option 2" and "Option 3" in Table 1), the orbit is optimized to maximize the signal availability to users in the coverage region. According to the second aspect, orbit parameters maximize the probability that at least one spacecraft's signal will be available at all locations at all times. According to the third aspect, orbit parameters maximize the probability that all operating spacecraft's signals will be available at all times. In all cases, the orbit parameters are determined based upon results for 125 representative North American cities.

The probability of signal availability is computed based upon known three-state statistical LMSS channel models, such as the model described in Y. Karasawa et al., *Analysis Of Availability Improvement In LMSS by Means Of Satellite Diversity Based On Three State Propagation Channel Model*, IEEE TRANSACTIONS ON VEHICULAR TECHNOLOGY, Vol. 46, No. 4 (November 1997) ("the Karasawa article"), which is incorporated by reference herein for all purposes. Using this model, the probability that a signal reaching the user will exceed a minimum needed for the receiver to operate $x_o$ is expressed by Equation (4), below:

$$p(x \geq x_0) = \int_{x_0}^{\infty} \{P_A f_a(x) + P_B f_b(x) + P_C f_c(x)\} dx \quad (4)$$

In Equation (4), $P_A$ is the probability that the line-of-sight ("LOS") from the user to the spacecraft is unobstructed, $P_B$ is the probability that the LOS is partially obstructed, and $P_C$ is the probability that the LOS is entirely obstructed. Also, $f_a$, $f_b$, and $f_c$ are probability density functions ("PDFs") that provide a statistical description of multi-path and signal attenuation effects for each of the obstruction cases. Further detail of this model, including appropriate parameters for urban and suburban environments, is omitted for the sake of brevity, and may be found by referencing the Karasawa article.

At any given time in the service region of the orbit, the probability $P_A$ is computed using Equation (5), below:

$$P_A = 1 - \frac{(90-\theta)^2}{a} \quad (5)$$

In Equation (5), $\theta$ is the elevation angle from the ground to the spacecraft, and $a$ is a parameter whose value depends on the obstruction environments. Based upon empirically-derived expressions that relate the ratio of $P_B$ and $P_C$, and given that $P_A+P_B+P_C=1$, the probability $P_B$ is determined by Equation (6), and $P_C$ is determined by Equation (7), below:

$$P_B = \begin{cases} \frac{4(1-P_A)}{5} & \text{for suburban area} \\ \frac{(1-P_A)}{5} & \text{for urban area} \end{cases} \quad (6)$$

$$P_C = \begin{cases} \frac{(1-P_A)}{5} & \text{for suburban area} \\ \frac{4(1-P_A)}{5} & \text{for urban area} \end{cases} \quad (7)$$

The probability that an insufficient signal is available at any given time for link closure from all j=1, K operational spacecraft is computed in Equation (8), below:

$$P_i^{none}(t) = \prod_{j=1}^{K} (1 - p_i^j(t)) \quad (8)$$

In Equation (8), $p_i^j(t)$ is the probability of signal availability computed from Equation (4) for the $i_{th}$ ground location, based on the elevation angle to the $j_{th}$ spacecraft. Similarly, the probability that sufficient signal is available for link closure simultaneously from all operational spacecraft is given by Equation (9), below:

$$P_i^{all}(t) = \prod_{j=1}^{K} p_i^j(t) \quad (9)$$

Using the results of these equations, cost functions are defined which, when minimized, result in optimized orbits for the second and third aspects. The cost function for the second aspect expressed in Equation (10), and the cost function for the third aspect is expressed in Equation (11), below:

$$J = \left[\frac{1}{N}\sum_{i=1}^{N}(\overline{P}_i^{none})^2\right]^{1/2} \quad (10)$$

$$J = \left[\frac{1}{N}\sum_{i=1}^{N}(1-\overline{P}_i^{all})^2\right]^{1/2} \quad (11)$$

In Equation (10), $\overline{P}_i^{none}$ is the average value of the probability given by Equation (8) over an orbit period, which is nominally one sidereal day. In Equation (11), $\overline{P}_i^{all}$ is the average value of the probability given by Equation (9).

Although the results assume a nominal link margin (in the absence of fade) of 8 dB, the optimized orbit parameters are insensitive to the link margin and whether the environment is suburban or urban.

Figure 7:
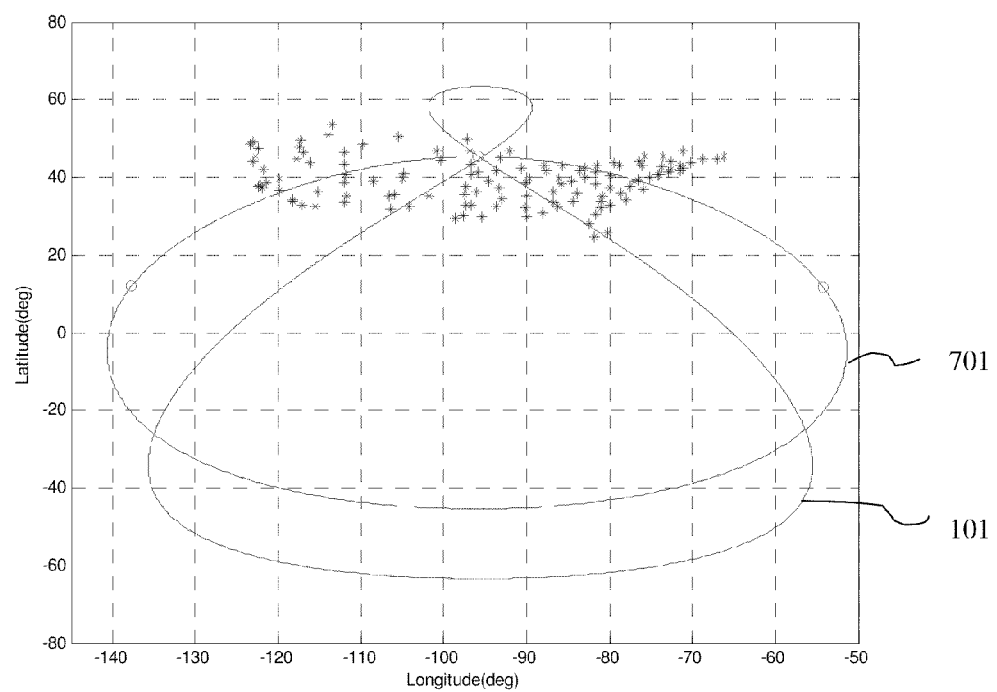
FIG. 7 depicts the ground track of an example improved orbit according to present invention, where the orbit is optimized based upon signal availability from at least one spacecraft, over a day of system operation, superimposed on the conventional, FIG. 1 ground track.

FIG. 7 depicts the ground track of an example improved orbit according to present invention, where the orbit is optimized based upon signal availability from at least one spacecraft, over a day of system operation, superimposed on the conventional, FIG. 1 ground track. The optimized ground track, denoted by reference 701, has an oval shape, and the spacecraft moves across the coverage region in a predominantly east-to-west direction. In contrast, the conventional orbit moves across the coverage region in a predominantly north-to-south direction.

Figure 8:
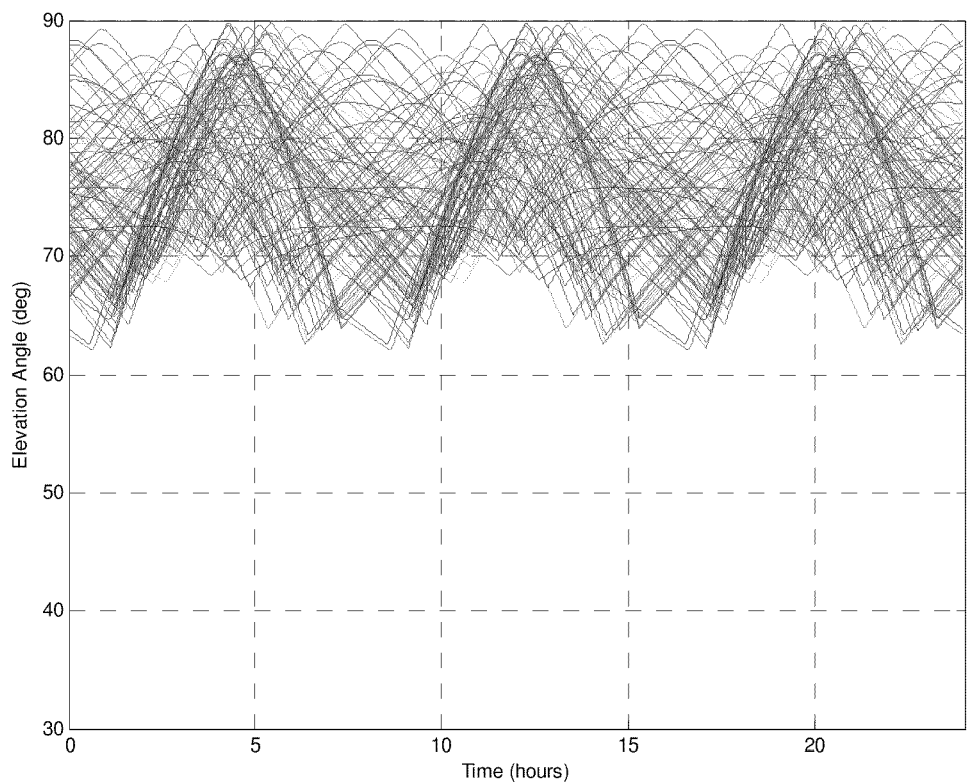
FIG. 8 depicts the corresponding elevation angles of the FIG. 7 improved orbit.

FIG. 8 depicts the corresponding elevation angles of the FIG. 7 improved orbit. Comparing FIG. 8 to FIG. 2, an increase in corresponding elevation angles is apparent.

Figure 3:
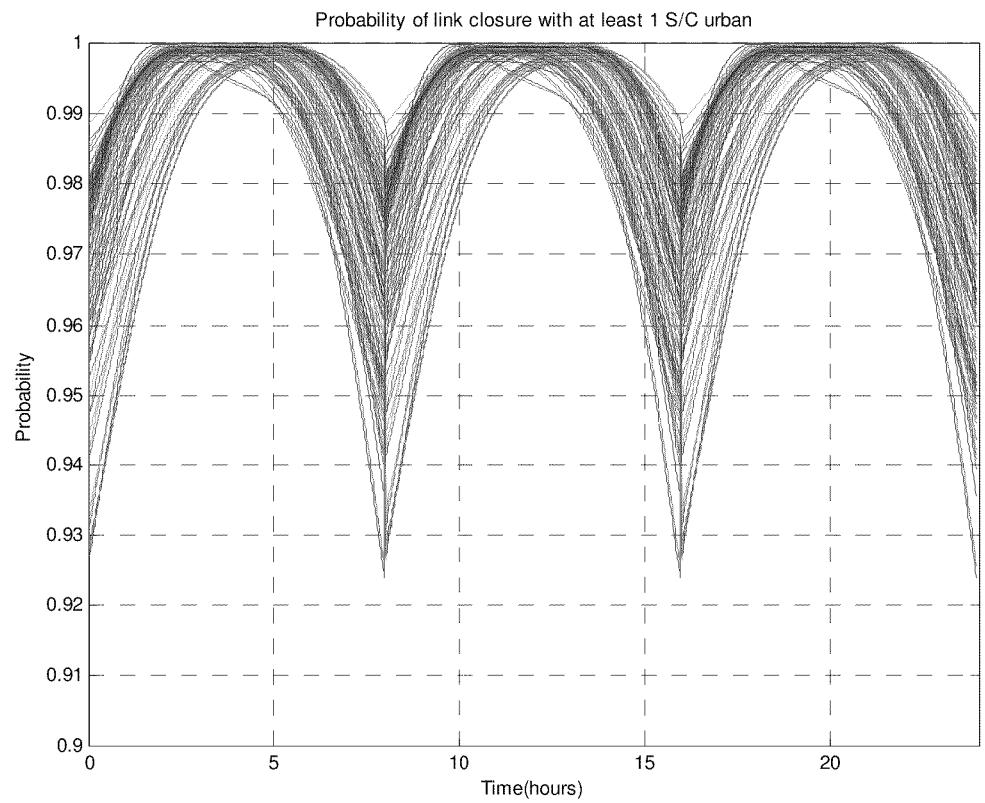
FIG. 3 depicts the probability of link closure in an urban environment with at least one spacecraft, for the FIG. 1 orbit.
Figure 9:
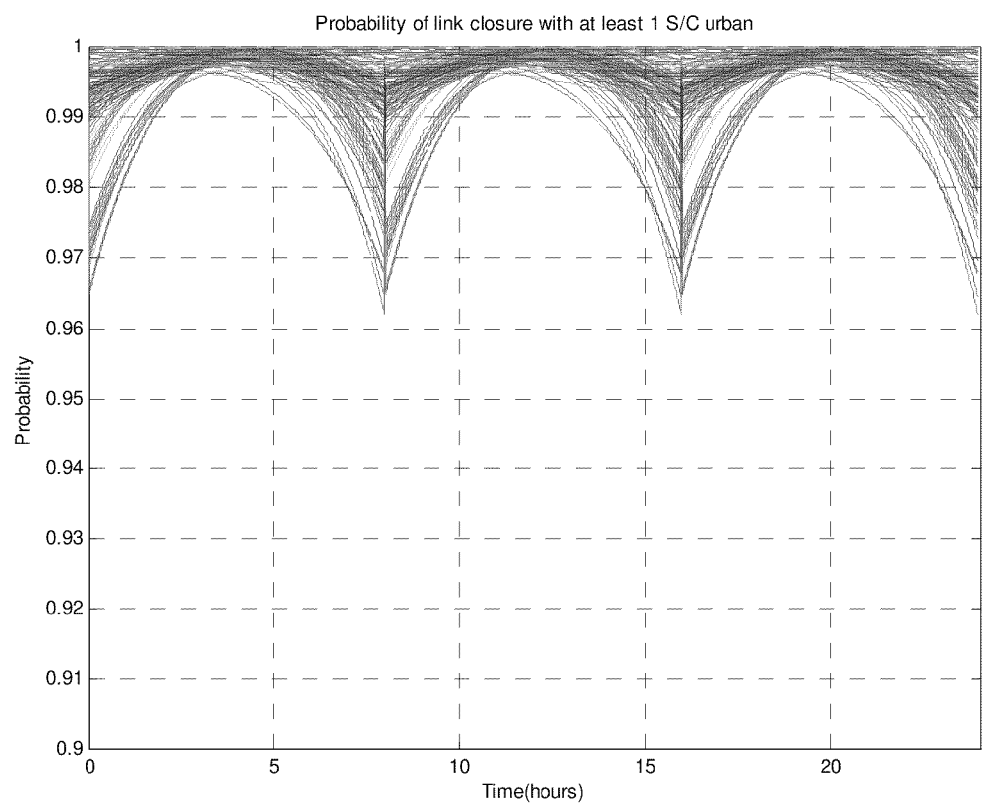
FIG. 9 depicts the probability of link closure in an urban environment with at least one spacecraft, for the FIG. 7 improved orbit.

FIG. 9 depicts the probability of link closure in an urban environment with at least one spacecraft, for the FIG. 7 orbit. Similarly, comparing FIG. 9 to FIG. 3, it is evident that there is a significant increase in link closure probability using the optimized orbit according to the present invention.

Figure 10:
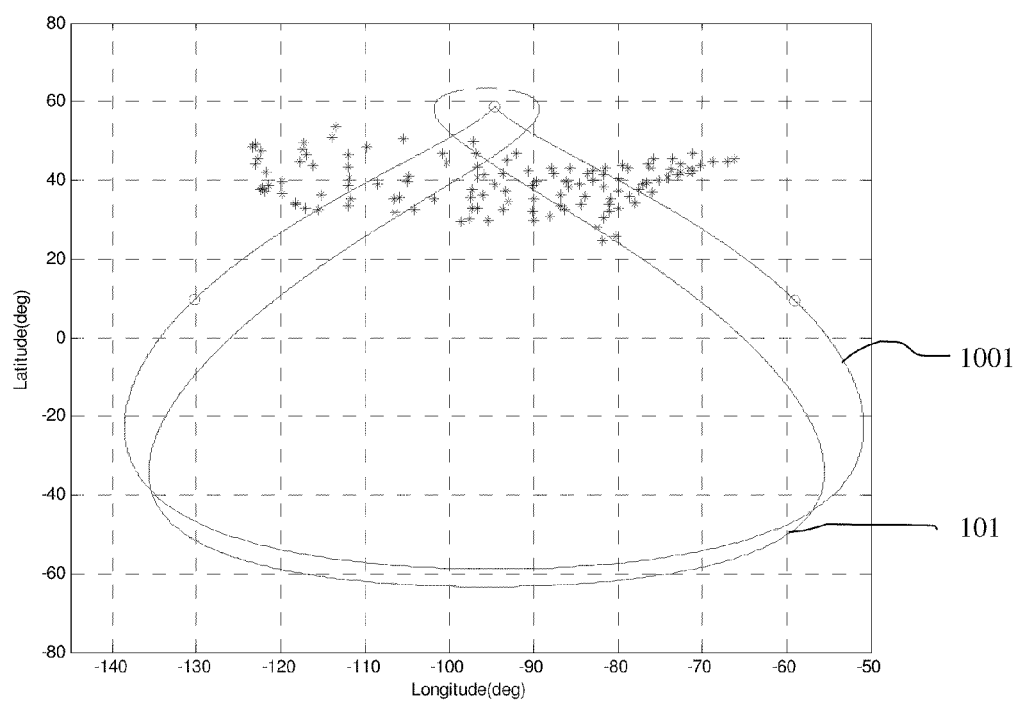
FIG. 10 depicts the ground track of an example improved orbit according to present invention, where the orbit is optimized based upon signal availability from all operating spacecraft, over a day of system operation, superimposed on the conventional, FIG. 1 ground track.

FIG. 10 depicts the ground track of an example improved orbit according to present invention, where the orbit is optimized based upon signal availability from all operating spacecraft, over a day of system operation, superimposed on the conventional, FIG. 1 ground track. The optimized ground track, denoted by reference 1001, has a teardrop shape, and the spacecraft spends increased time over the coverage region compared to the FIG. 1 ground track.

Figure 11:
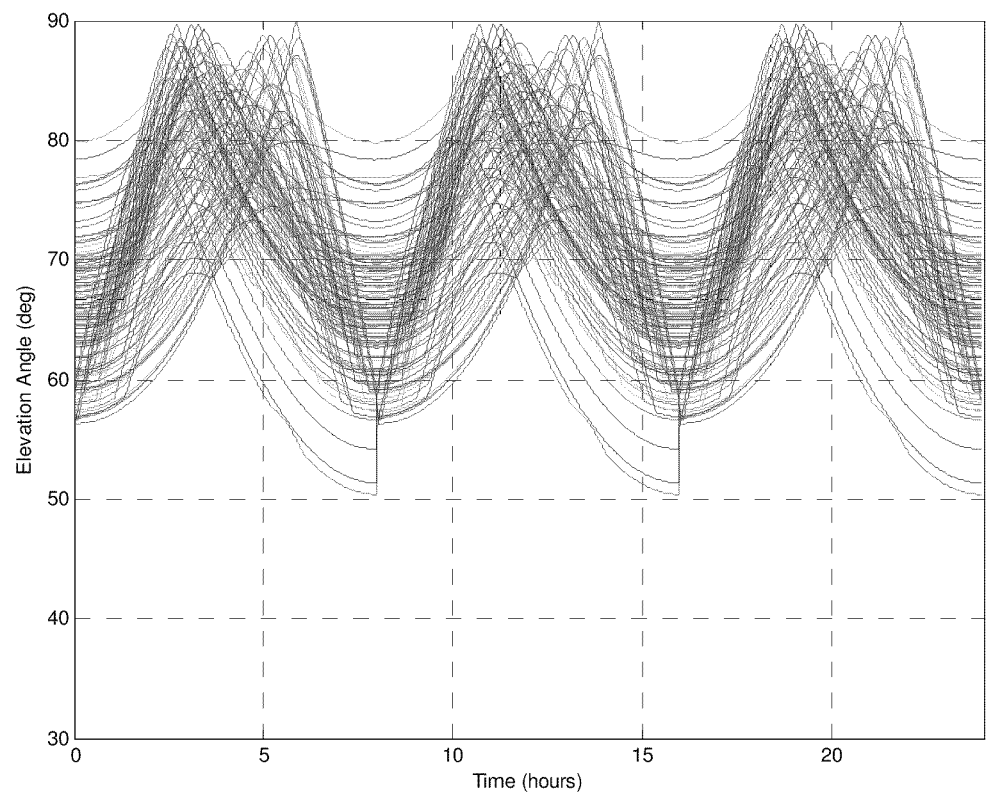
FIG. 11 depicts the corresponding elevation angles of the FIG. 10 improved orbit.

FIG. 11 depicts the corresponding elevation angles of the FIG. 10 improved orbit. Comparing FIG. 11 to FIG. 2, an increase in corresponding elevation angles is also apparent.

Figure 4:
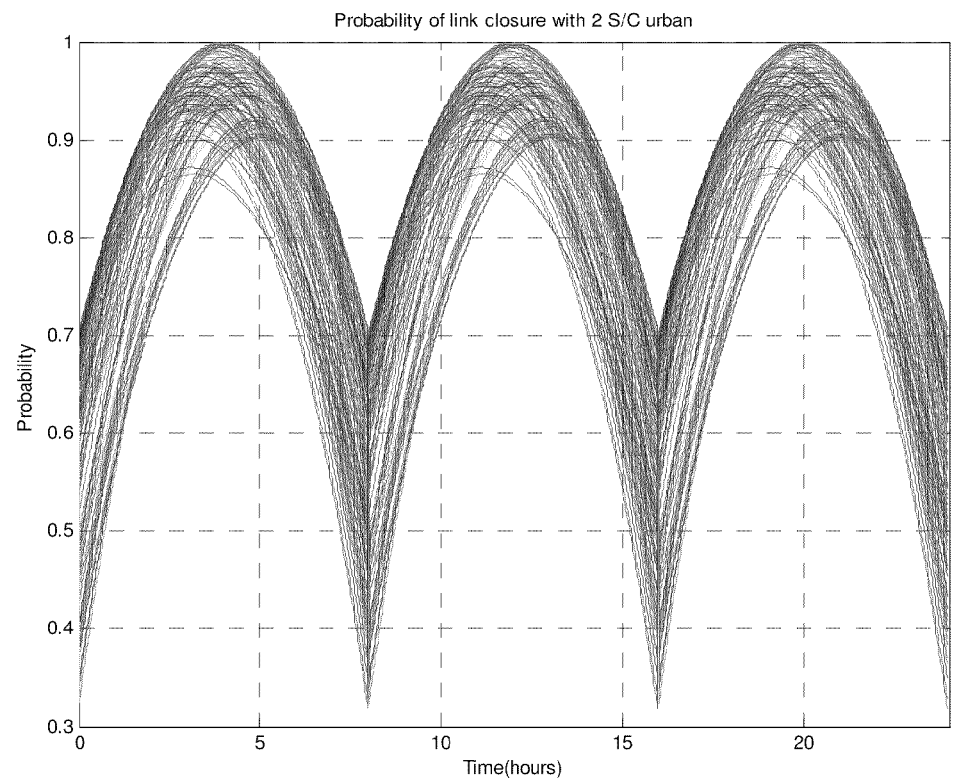
FIG. 4 depicts the probability of link closure in an urban environment with at least two spacecraft, for the FIG. 1 orbit.
Figure 12:
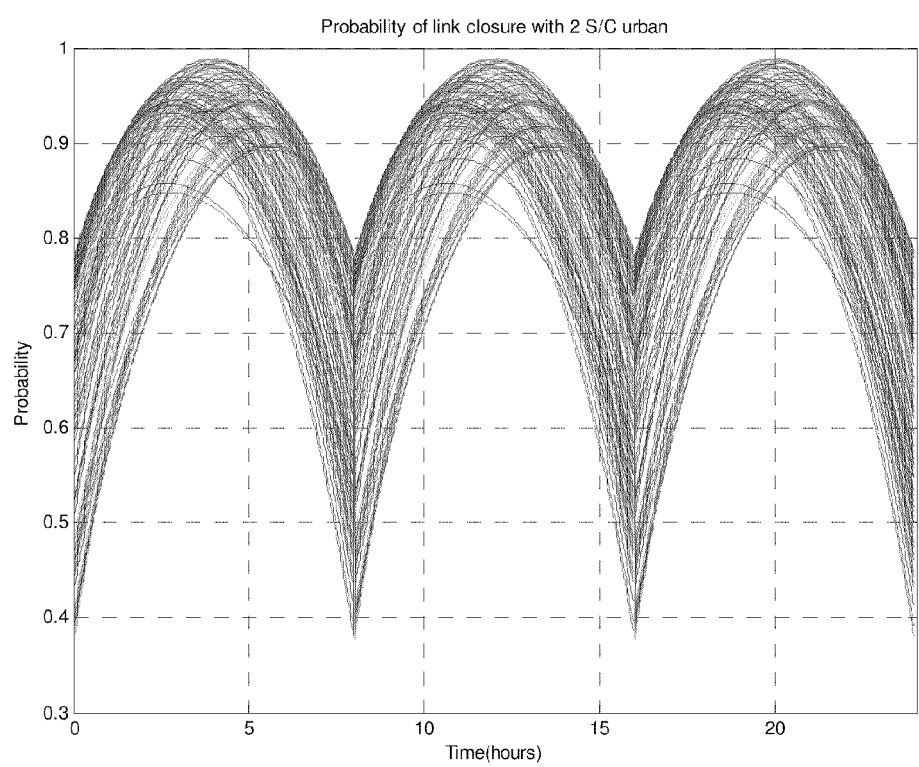
FIG. 12 depicts the probability of link closure in an urban environment with two spacecraft, for the FIG. 10 orbit.

FIG. 12 depicts the probability of link closure in an urban environment with two spacecraft, for the FIG. 10 orbit. Comparing FIG. 12 to FIG. 4, a significant increase in link closure probability is evident using the optimized orbit according to the present invention.

Figure 13A:
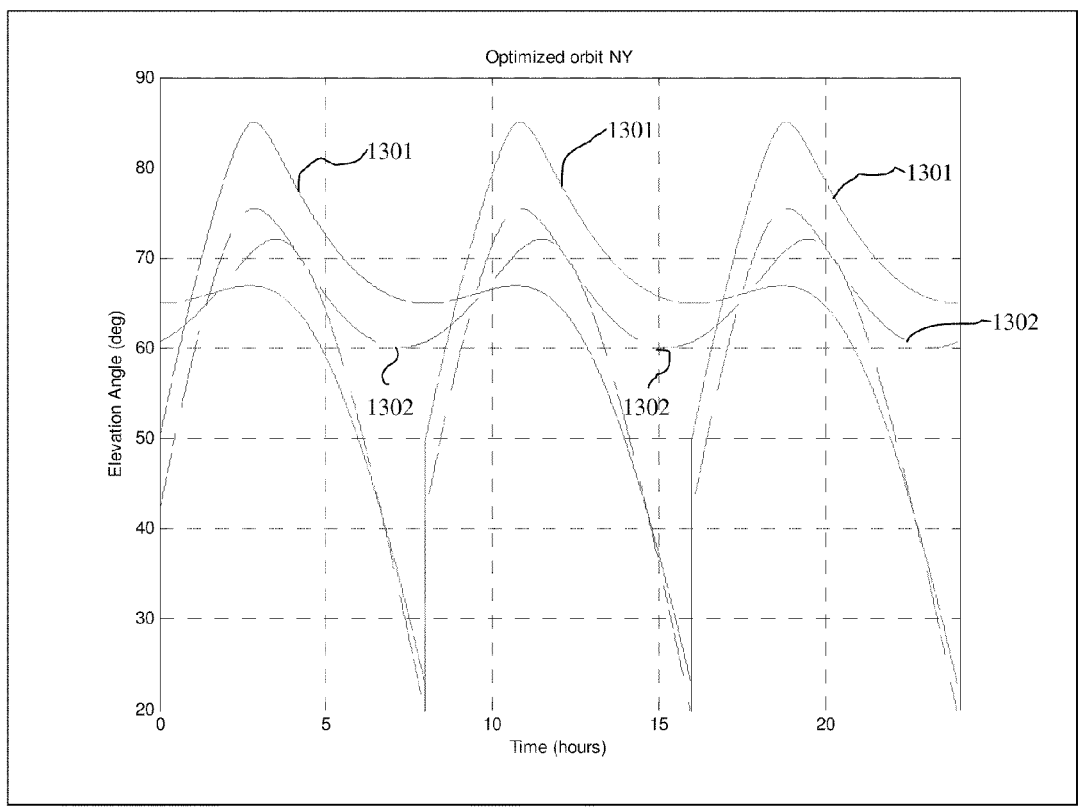
FIGS. 13A to 13C show the elevation angle time history over a day for New York, Los Angeles, and Seattle, respectively, for the improved orbit and conventional orbit.
Figure 13B:
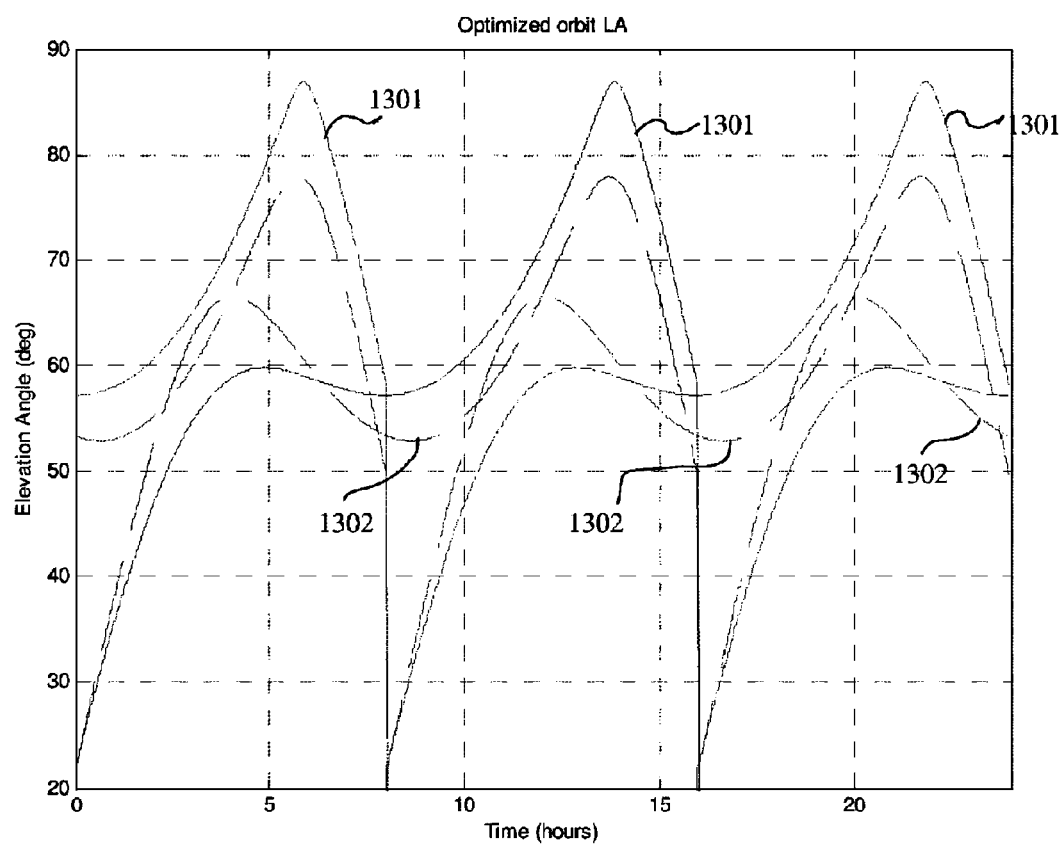
Figure 13C:
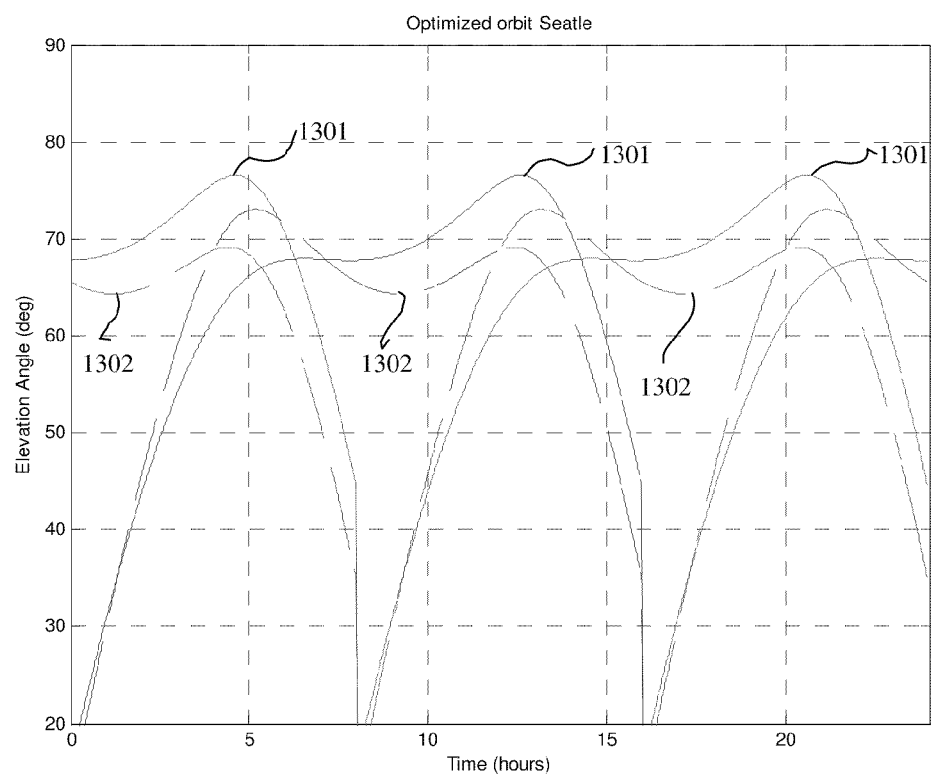

To further illustrate the performance improvement using the FIG. 10 orbit, FIGS. 13A to 13C show the elevation angle time history over a day for New York, Los Angeles, and Seattle, respectively, for the improved orbit and conventional orbit. The solid lines (denoted by reference 1301) show the optimized orbit elevation angles, and the dashed lines (denoted by reference 1302) show the elevation angles for spacecraft in the conventional orbit. The significant increase in the composite elevation angle, which is the envelope formed by the maximum of the elevation angles for all operating spacecraft, is readily seen. Furthermore, in addition to the increase in the minimum composite angle which occurs at 8-hour intervals, including 0, 8, 16 and 24 hours in FIGS. 13A to 13C, the elevation angles for the other two spacecraft at these times are generally higher than for conventional orbits. These attributes account for the improvement in the two spacecraft link availability achieved by the FIG. 10 orbit.

Regarding the optimization of orbits based upon performance criteria, different optimization criteria will result in different optimized orbits, and other spacecraft and system design constraints may favor the use of one orbit over another. Extensive analysis has shown that optimal orbits for North American LMSS have inclinations between 40° and 60°, eccentricities between 0.16 and 0.4. The ground tracks of the optimal orbits have an oval or teardrop shape, and lack a significant figure-eight loop. The longitude of the orbit apogee, and correspondingly the longitude of the highest latitude of the ground track, is between 90° and 100° west.

Figure 14:
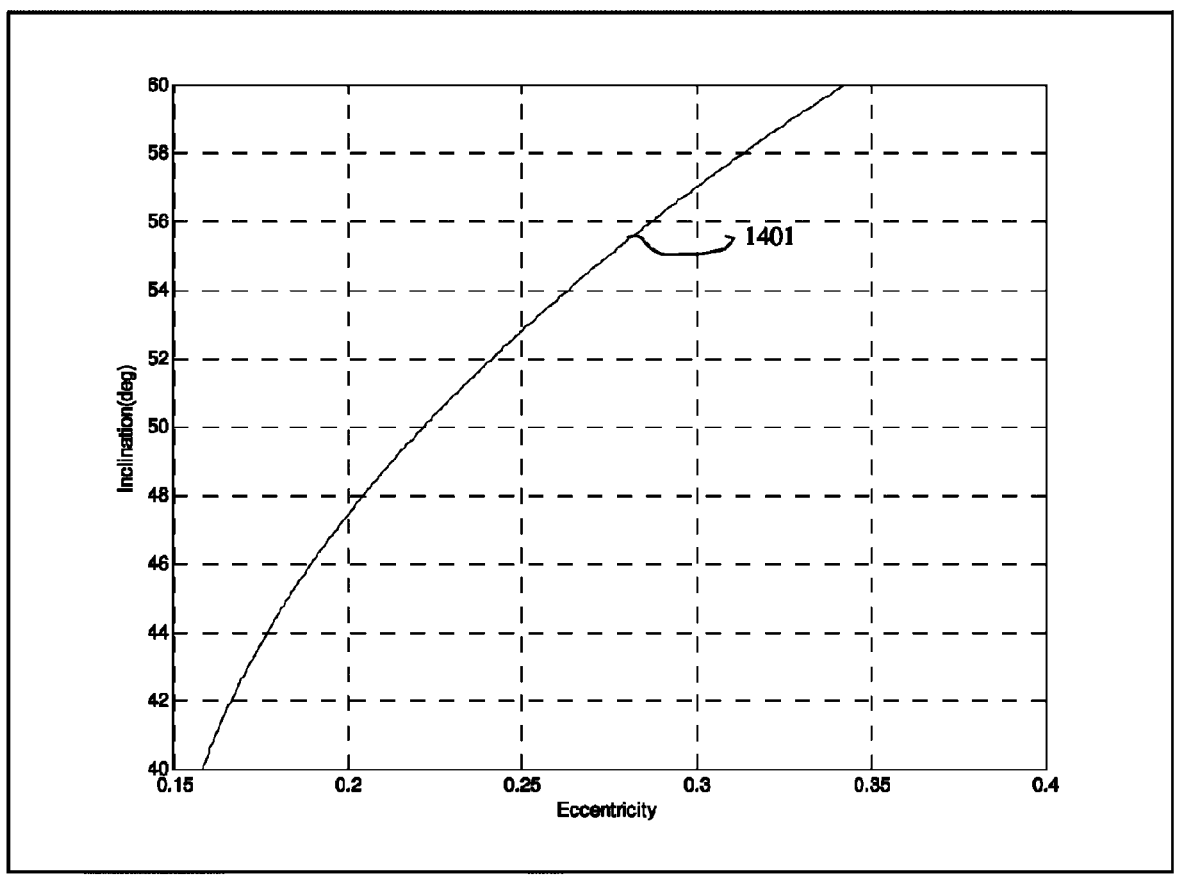
FIG. 14 depicts the inclination and eccentricity region indicative of the optimal orbits contemplated by the present invention.
Figure 15A:
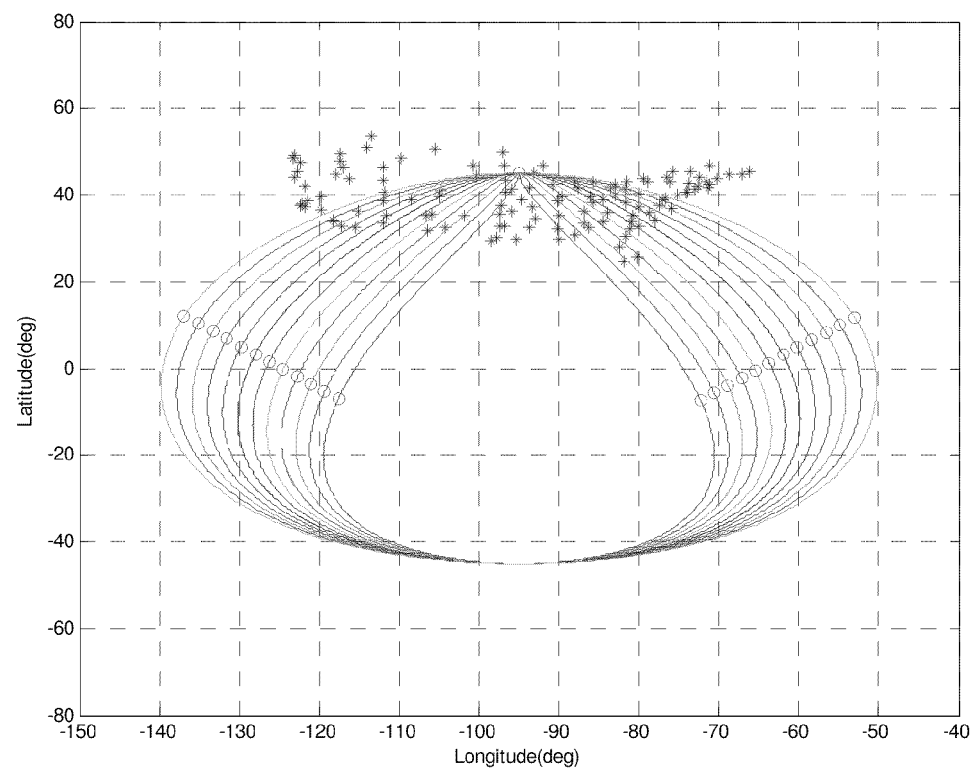
FIGS. 15A and 15B respectively depict the ground tracks for a family of orbits with an inclination of 45°, and with eccentricities from 0.18 to 0.40, in increments of 0.02, and a corresponding plot of average and minimum elevation, which shows that the optimal elevation angle orbit is included within the specified parameter region.
Figure 15B:
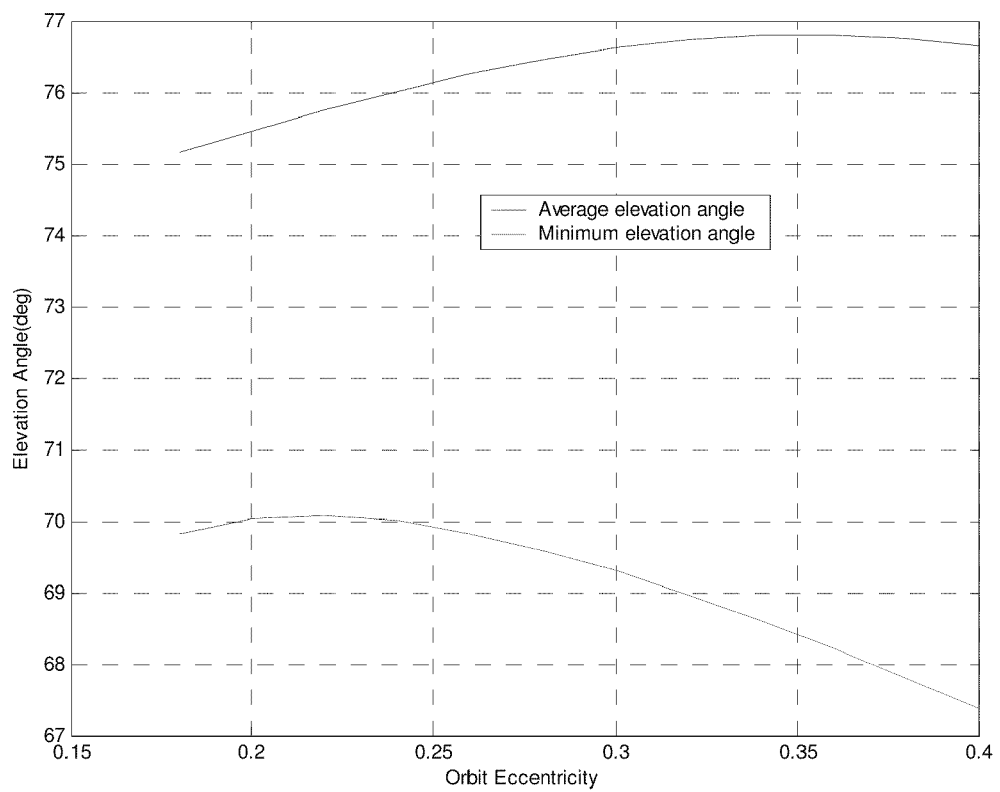

The optimal orbits contemplated by the present invention are included within the inclination and eccentricity region depicted in FIG. 14. The inclination and eccentricity region is depicted in FIG. 14 for inclinations of 40° to 60° and on the right-hand side of curve 1401 in FIG. 14, with the lower-bound eccentricities of 0.16 at 40° inclination and 0.34 at 60° inclination.

FIGS. 15 to 18 illustrate specific example orbits from the family of optimal orbits defined within the inclination and eccentricity region of FIG. 14, which are contemplated by the present invention. In particular, FIG. 15A depicts the ground tracks for a family of orbits with an inclination of 45°, and with eccentricities from 0.18 to 0.40, in increments of 0.02. FIG. 15B depicts a corresponding plot of average and minimum elevation, which shows that the optimal elevation angle orbit is included within the specified parameter region.

Figure 16A:
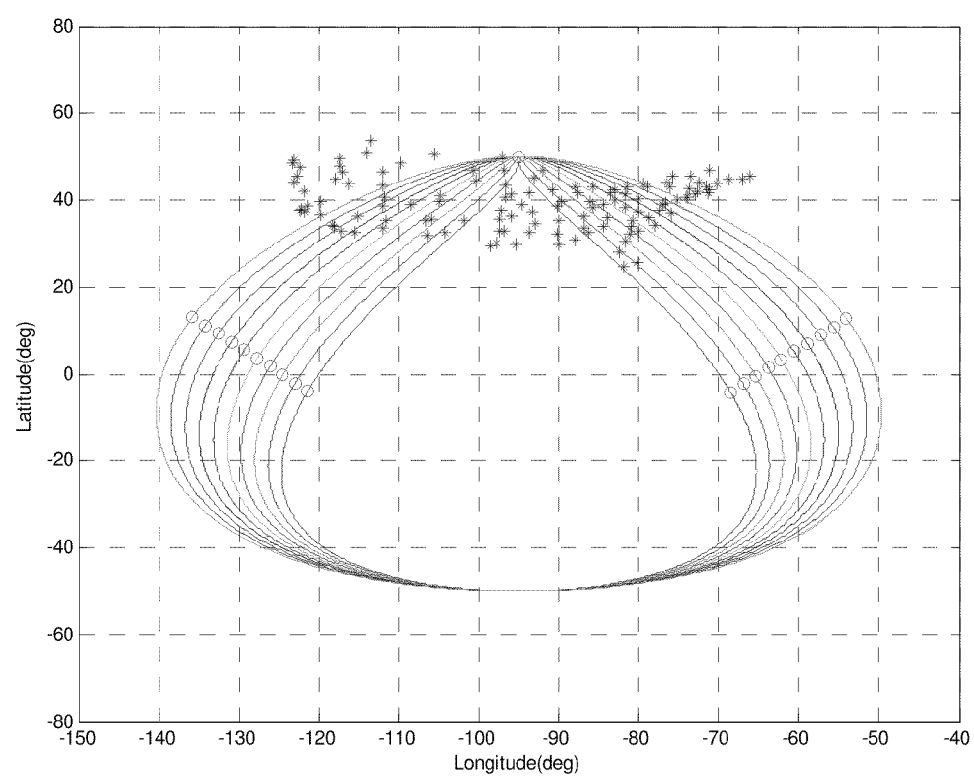
FIGS. 16A and 16B respectively depict the ground tracks for a family of orbits with an inclination of 50°, and with eccentricities from 0.22 to 0.40, in increments of 0.02, and a corresponding plot of average and minimum elevation, which shows that the optimal elevation angle orbit is included within the specified parameter region.
Figure 16B:
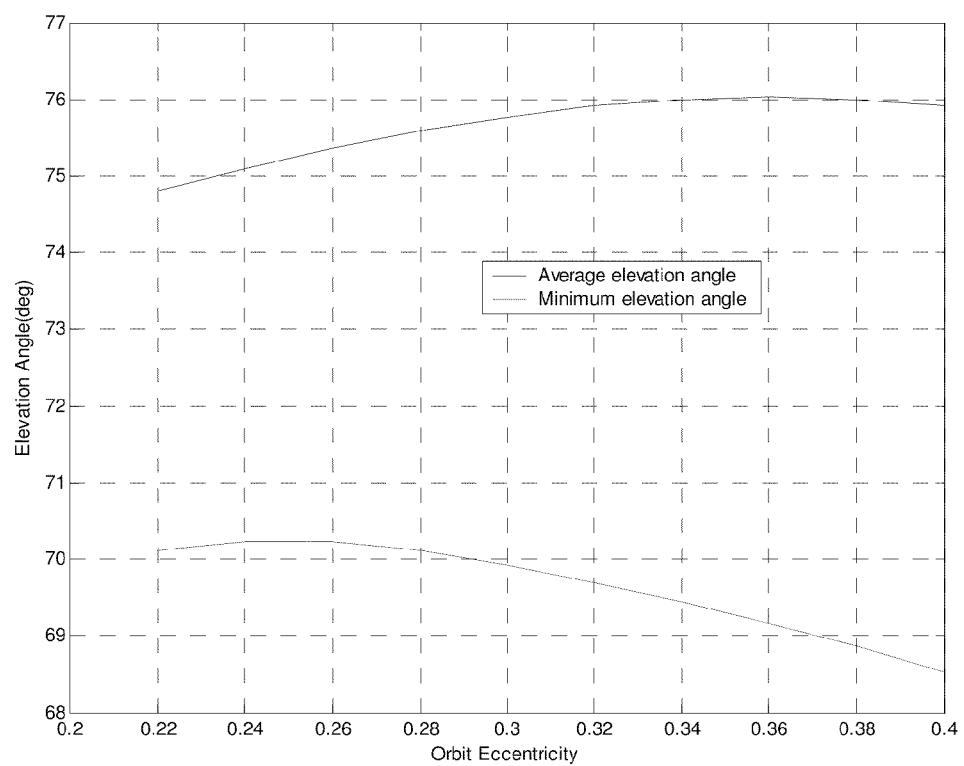

FIG. 16A depicts the ground tracks for a family of orbits with an inclination of 50°, and with eccentricities from 0.22 to 0.40, in increments of 0.02. FIG. 16B depicts a corresponding plot of average and minimum elevation, which shows that the optimal elevation angle orbit is included within the specified parameter region.

Figure 17A:
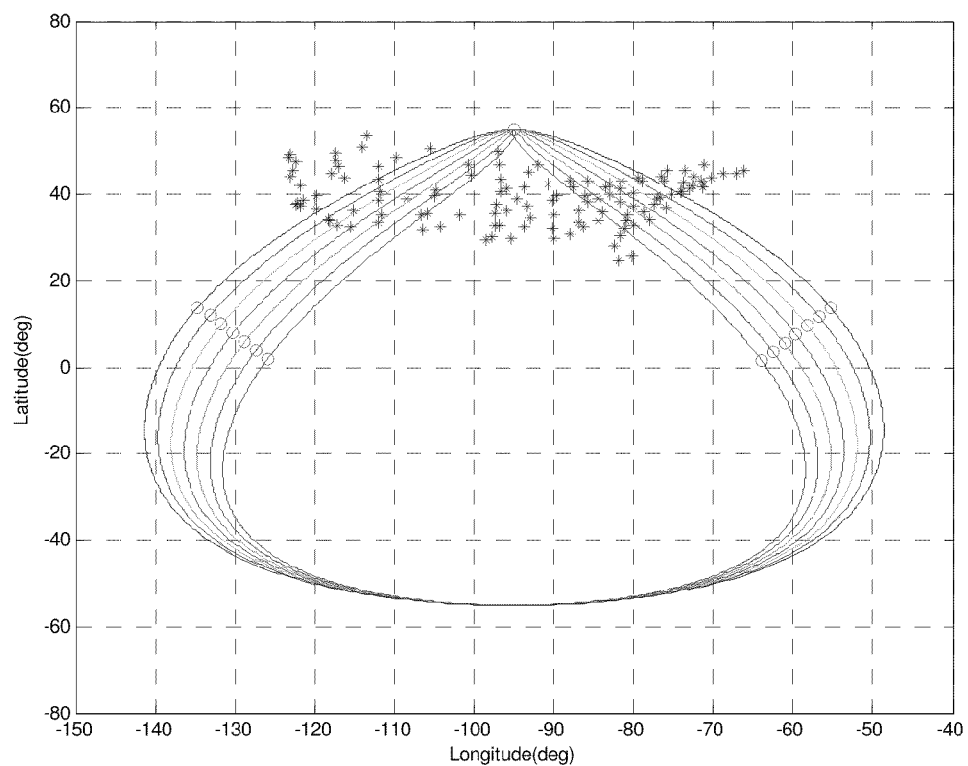
FIGS. 17A and 17B respectively depict the ground tracks for a family of orbits with an inclination of 55°, and with eccentricities from 0.28 to 0.40, in increments of 0.02, and a corresponding plot of average and minimum elevation, which shows that the optimal elevation angle orbit is included within the specified parameter region.
Figure 17B:
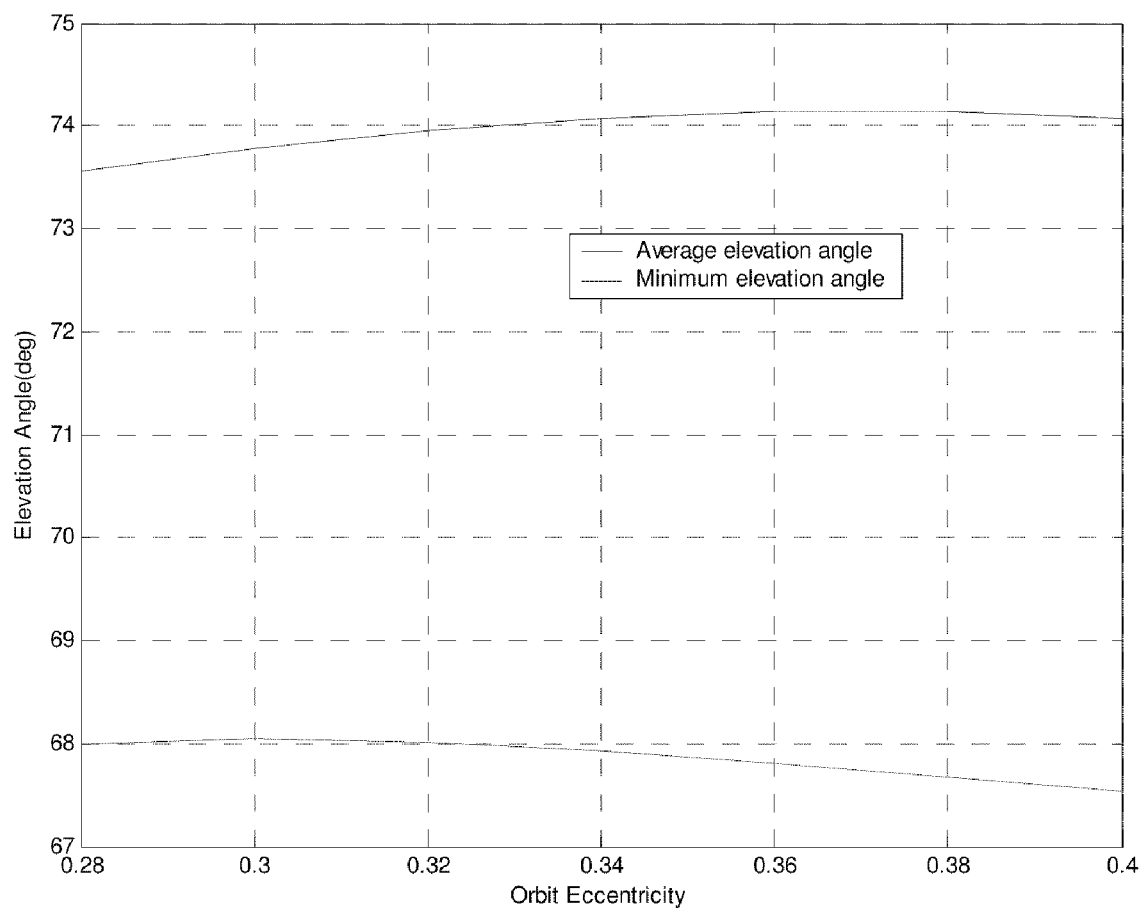

FIG. 17A depicts the ground tracks for a family of orbits with an inclination of 55°, and with eccentricities from 0.28 to 0.40, in increments of 0.02. FIG. 17B depicts a corresponding plot of average and minimum elevation, which shows that the optimal elevation angle orbit is included within the specified parameter region.

Figure 18A:
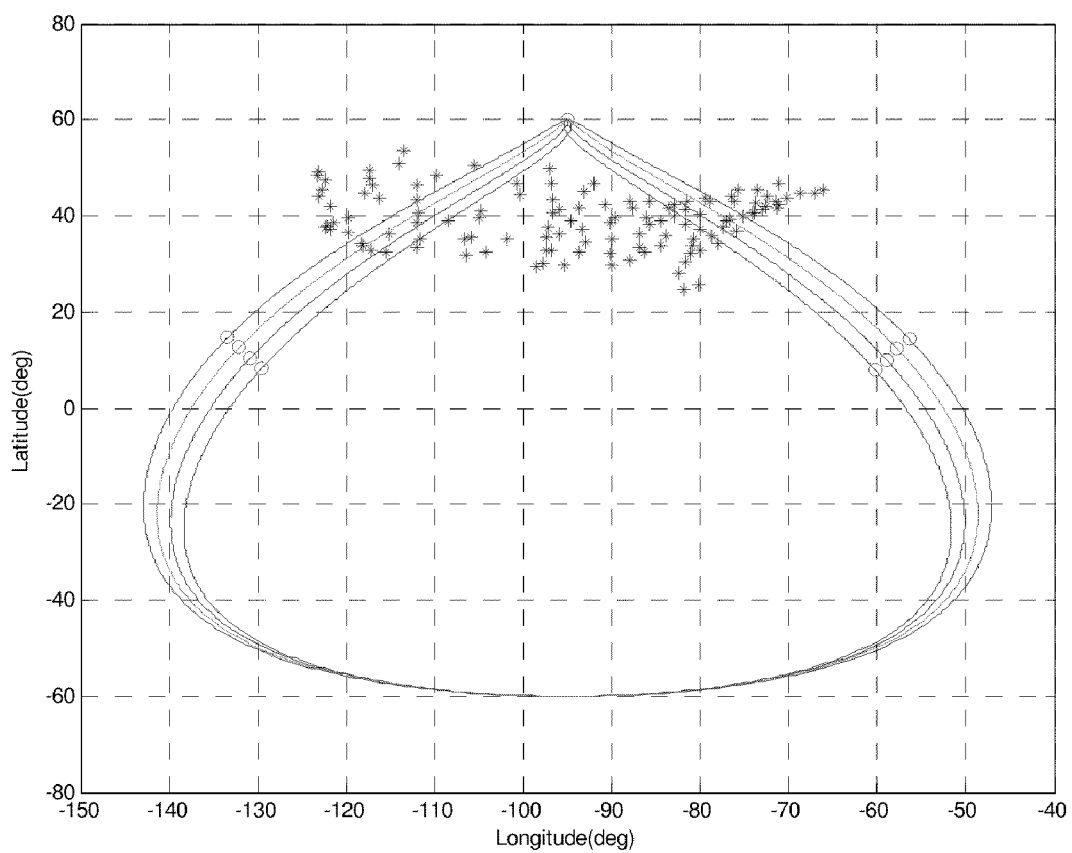
FIGS. 18A and 18B respectively depict the ground tracks for a family of orbits with an inclination of 60°, and with eccentricities from 0.34 to 0.40, in increments of 0.02, and a corresponding plot of average and minimum elevation, which shows that the optimal elevation angle orbit is included within the specified parameter region.
Figure 18B:
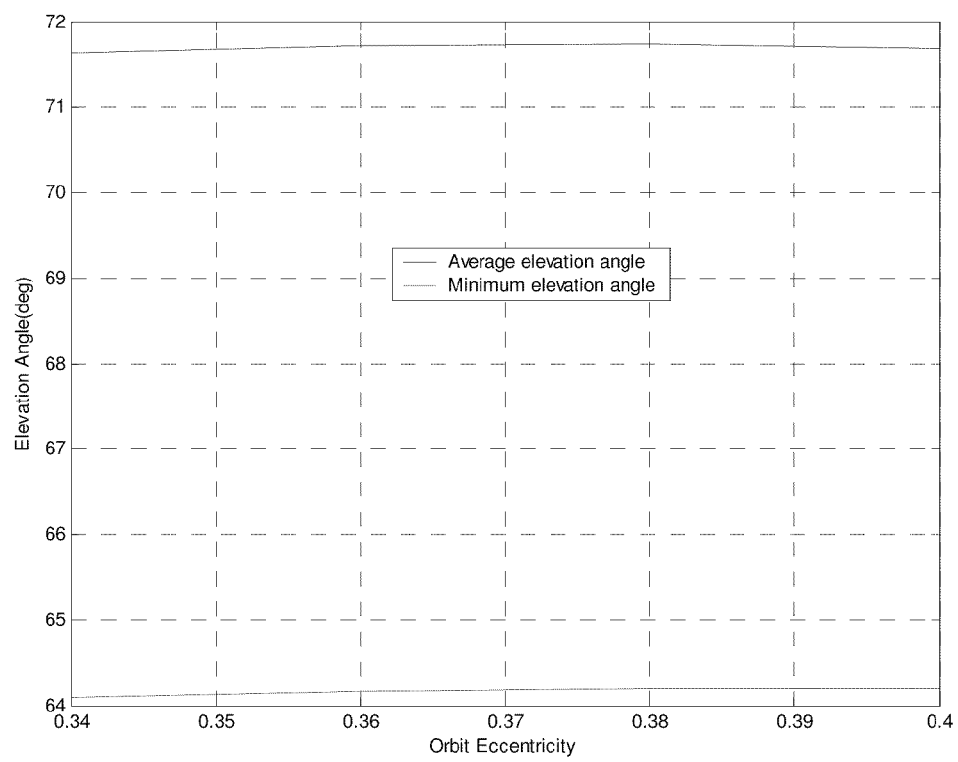

FIG. 18A depicts the ground tracks for a family of orbits with an inclination of 60°, and with eccentricities from 0.34 to 0.40, in increments of 0.02. FIG. 18B depicts a corresponding plot of average and minimum elevation, which shows that the optimal elevation angle orbit is included within the specified parameter region.

Figure 19:
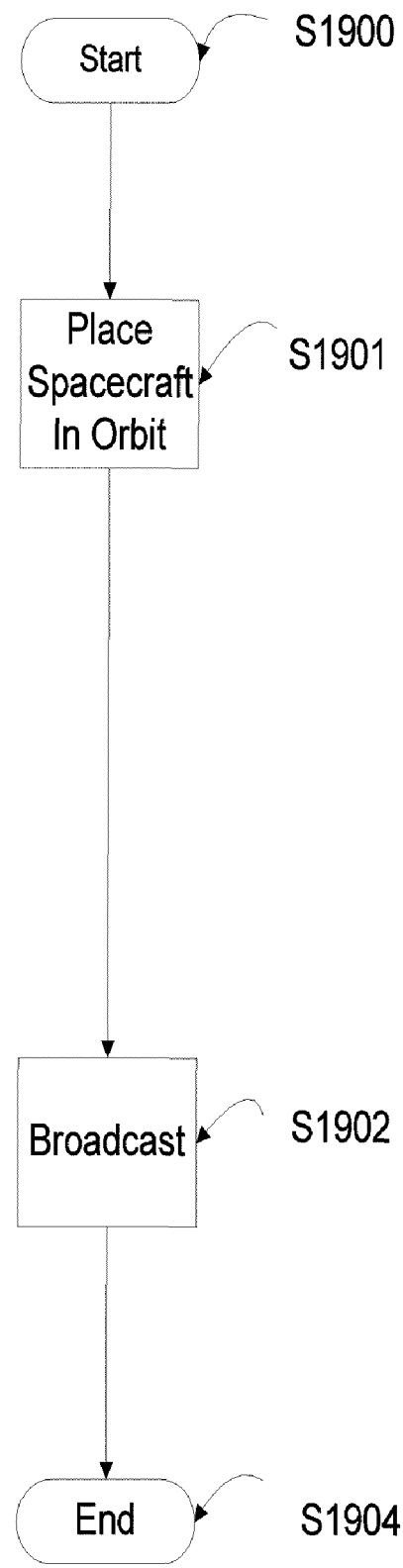
FIG. 19 is a flowchart depicting a method of providing North American mobile satellite services, according to a second arrangement of the present invention.

According to a second arrangement, depicted in FIG. 19, the present invention is a method of providing North American mobile satellite services. Briefly, the method includes the step of placing a plurality of broadcast spacecraft in similar approximately 24-hour orbits which may be rotated relative to each other, each of the plurality of spacecraft including a broadcast capability, each of the orbits having a substantially teardrop-shaped or oval-shaped ground track, being optimized based upon performance criteria, and having an apogee longitude of approximately 90° west to approximately 100° west. The method also includes the step of broadcasting from each of the plurality of spacecraft.

In more detail, the process begins (step S1900), and a plurality of broadcast spacecraft is placed in similar approximately 24-hour orbits which may be rotated relative to each other (step S1901). Each of the plurality of spacecraft include a broadcast capability. Each of the orbits has a substantially teardrop-shaped or oval-shaped ground track, and is optimized based upon performance criteria. Furthermore, each of the orbits has an apogee longitude of approximately 90° west to approximately 100° west.

Each of the plurality of spacecraft broadcasts (step S1902), providing North American mobile satellite services, and the process ends (step S1904). Each of the plurality of spacecrafts broadcasts when the spacecraft is in the northern hemisphere.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for determining orbits for a plurality of satellites in a constellation for providing a satellite service using the plurality of satellites in the constellation, comprising:
    determining an orbit for each one of the plurality of satellites in the constellation, the determining of the orbit comprising:
    determining one or more orbit parameters of the orbit for each one of the plurality of satellites, by minimizing a cost function selected from the group of $$J = \sum_{i=1}^{N} w_i (90° - \min[\theta_i(t, e, i, L, \omega)])^2]^{1/2},$$

$$J = \left[\frac{1}{N}\sum_{i=1}^{N}(\overline{P}_i^{none})^2\right]^{1/2} \text{ and } J = \left[\frac{1}{N}\sum_{i=1}^{N}(1-\overline{P}_i^{all})^2\right]^{1/2},$$

wherein $90°-\min[\theta_i(t,e,i,L,\omega)]$ represents a maximum co-elevation angle for an ith city over a single sidereal day, t is a number between 0 and $T_{orbit}$, $T_{orbit}$ represents an orbit period, e represents an orbit eccentricity, i represents an orbit inclination, L represents a longitude of an ascending node, ω represents an argument of perigee, N represents a number of cities, and $w_i$ represents normalized city weighting factors,
wherein $\overline{P}i^{none}$ represents an average value of probability based on an insufficient signal, and $\overline{P}i^{all}$ represents an average value of probability based on a sufficient signal.

2. The method of claim 1, further comprising configuring each of the plurality of satellites with the corresponding one or more orbit parameters.

3. The method of claim 1, further comprising
    transmitting a signal from one of the plurality of satellites in the orbit having the determined one or more orbit parameters.

4. The method of claim 1, wherein the one or more orbit parameters comprise an argument of perigee of approximately 270°.

5. The method of claim 1, wherein the one or more orbit parameters comprise an inclination of approximately 40° to approximately 60°.

6. The method of claim 1, wherein the one or more orbit parameters comprise an eccentricity of approximately 0.16 to approximately 0.4.

7. The method of claim 1, wherein the one or more orbit parameters comprise an average elevation angle of 72° to 77°.

8. The method of claim 1, wherein each of the orbits is an approximately 24-hour orbit, and wherein the one or more orbit parameters comprise an apogee longitude of approximately 90° west to approximately 100° west.

9. The method of claim 1, wherein the orbit has a substantially teardrop-shaped or oval-shaped ground track.

10. The method of claim 1, wherein the plurality of satellites include a first, second and third satellites, and the orbits of the plurality of satellites are selected to bring each of the plurality of satellites to an apogee at time increments of approximately eight hours.

11. The method of claim 1, wherein the determining of the orbit is optimized based upon performance criteria including signal availability from at least one of the plurality of satellites.

12. The method of claim 1, wherein the determining of the orbit is optimized based upon performance criteria including signal availability from all of the plurality of satellites.

13. The method of claim 1, wherein the cost function is $$J = \left[\sum_{i=1}^{N} w_i(90° - \min[\theta_i(t, e, i, L, \omega)])^2\right]^{1/2}.$$

14. The method of claim 1, wherein the cost function is $$J = \left[\frac{1}{N}\sum_{i=1}^{N} (\overline{P}_i^{none})^2\right]^{1/2}.$$

15. The method of claim 1, wherein the cost function is $$J = \left[\frac{1}{N}\sum_{i=1}^{N} (1 - \overline{P}_i^{all})^2\right]^{1/2}.$$

16. A method for providing satellite services, the method comprising:
placing a plurality of spacecraft in orbits, each of the plurality of spacecraft including a broadcast capability, each of the orbits having a substantially teardrop-shaped or oval-shaped ground track, each of the orbits optimized based upon a cost function selected from the group of $$J = \sum_{i=1}^{N} w_i(90° - \min[\theta_i(t, e, i, L, \omega)])^2]^{1/2},$$

$$J = \left[\frac{1}{N}\sum_{i=1}^{N} (\overline{P}_i^{none})^2\right]^{1/2} \text{ and } J = \left[\frac{1}{N}\sum_{i=1}^{N} (1 - \overline{P}_i^{all})^2\right]^{1/2},$$

wherein $90° - \min[\theta_i(t,e,i,L,\omega)]$ represents a maximum co-elevation angle for an ith city over a single sidereal day, t is a number between 0 and $T_{orbit}$, $T_{orbit}$ represents an orbit period, e represents an orbit eccentricity, i represents an orbit inclination, L represents a longitude of an ascending node, co represents an argument of perigee, N represents a number of cities, and $w_i$ represents normalized city weighting factors,
wherein $\overline{P}_i^{none}$ represents an average value of probability based on an insufficient signal, and $\overline{P}_i^{all}$ represents an average value of probability based on a sufficient signal; and
broadcasting from each of the plurality of spacecraft.

17. The method of claim 16, wherein the broadcasting is performed when the plurality of spacecraft are in the northern hemisphere.

18. The method of claim 16, wherein each of the orbits comprises an argument of perigee of approximately 270°.

19. The method of claim 16, wherein each of the orbits comprises an average elevation angle of 72° to 77°.

20. The method of claim 16, wherein the plurality of spacecraft are placed in the orbits that are similar approximately 24-hour orbits which are rotatable relative to each other, and wherein each of the orbits comprises an apogee longitude of approximately 90° west to approximately 100° west.

21. The method of claim 16, wherein the plurality of spacecraft include a first, second and third spacecraft, and the orbits of the plurality of spacecraft are selected to bring each of the plurality of spacecraft to an apogee at time increments of approximately eight hours.

22. The method of claim 16, wherein each of the orbits is optimized based upon performance criteria including signal availability from at least one of the plurality of spacecraft.

23. The method of claim 16, wherein the cost function is $$J = \left[\sum_{i=1}^{N} w_i(90° - \min[\theta_i(t, e, i, L, \omega)])^2\right]^{1/2}.$$

24. The method of claim 16, wherein the cost function is $$J = \left[\frac{1}{N}\sum_{i=1}^{N} (\overline{P}_i^{none})^2\right]^{1/2}.$$

25. The method of claim 16, wherein the cost function is $$J = \left[\frac{1}{N}\sum_{i=1}^{N} (\overline{P}_i^{all})^2\right]^{1/2}.$$

* * * * *

UNITED STATES PATENT AND TRADEMARK OFFICE
CERTIFICATE OF CORRECTION

PATENT NO. : 7,946,533 B2
APPLICATION NO. : 12/606145
DATED : May 24, 2011
INVENTOR(S) : Neil Evan Goodzeit It is certified that error appears in the above-identified patent and that said Letters Patent is hereby corrected as shown below:

IN THE CLAIMS

Column 11, Line 46: Replace "$J = \left[ \sum_{i=1}^{N} w_i (90° - min\, \theta_i (t,e,i,L,\omega)\,])^2 \right]^{1/2}$", with -- $J = \left[ \sum_{i=1}^{N} w_i (90° - min[\theta_i(t,e,i,L,\omega)])^2 \right]^{1/2}$ --

Column 12, Line 50: Replace "$J = \left[ \frac{1}{N} \sum_{i=1}^{N} (\overline{P}_i^{all})^2 \right]^{1/2}$", with -- $J = \left[ \frac{1}{N} \sum_{i=1}^{N} (1 - \overline{P}_i^{all})^2 \right]^{1/2}$ --

Signed and Sealed this
Fifteenth Day of November, 2011

David J. Kappos
*Director of the United States Patent and Trademark Office*